(12) United States Patent
Okazaki et al.

(10) Patent No.: US 11,915,188 B2
(45) Date of Patent: Feb. 27, 2024

(54) DELIVERY SERVER, SETTLEMENT SYSTEM, COMPUTER READABLE RECORDING MEDIUM, AND TRANSMISSION METHOD

(71) Applicant: TOYOTA JIDOSHA KABUSHIKI KAISHA, Toyota (JP)

(72) Inventors: Kenji Okazaki, Toyota (JP); Masato Endo, Chofu (JP); Mayumi Kurita, Tokyo-to (JP); Masashi Toritani, Tokyo-to (JP); Kumiko Matsuura, Tokyo-to (JP); Takayuki Shikoda, Tokyo-to (JP); Masaaki Otsuka, Kawasaki (JP); Yoshikazu Ishii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/228,281

(22) Filed: Apr. 12, 2021

(65) Prior Publication Data

US 2021/0334746 A1    Oct. 28, 2021

(30) Foreign Application Priority Data

Apr. 22, 2020 (JP) ................................ 2020-076223

(51) Int. Cl.
*G06Q 10/0833* (2023.01)
*G06Q 20/10* (2012.01)
(Continued)

(52) U.S. Cl.
CPC ....... *G06Q 10/0833* (2013.01); *G06Q 20/108* (2013.01); *G06Q 20/3676* (2013.01); *G06Q 40/02* (2013.01)

(58) Field of Classification Search
CPC ............. G06Q 10/0833; G06Q 20/108; G06Q 20/3676; G06Q 40/02
(Continued)

(56) References Cited

U.S. PATENT DOCUMENTS

| 2003/0182223 | A1  | 9/2003 | Kuroda |           |
| 2004/0030572 | A1* | 2/2004 | Campbell | G01C 21/26 |
|              |     |        |          | 705/333    |

(Continued)

FOREIGN PATENT DOCUMENTS

| CN | 110689297 A   | 1/2020  |
| JP | 2003-281407 A | 10/2003 |

(Continued)

*Primary Examiner* — Jessica Lemieux
(74) *Attorney, Agent, or Firm* — Oliff PLC (57) ABSTRACT

A delivery server includes a processor including hardware, the processor being configured to: transmit arrival information of a product to a user terminal carried by a user who has ordered the product; transmit, in a case where unattended delivery is instructed by the user terminal, unattended delivery information to a home delivery terminal of a delivery person who delivers the product, and request a signature of the user; transmit the signature information to the home delivery terminal in response to receiving signature information regarding the signature of the user from the user terminal; and transmit delivery completion information of the product to the user terminal.

14 Claims, 4 Drawing Sheets

(51) Int. Cl.
*G06Q 40/02* (2023.01)
*G06Q 20/36* (2012.01)

(58) Field of Classification Search
USPC .......................................................... 705/42
See application file for complete search history.

(56) References Cited

U.S. PATENT DOCUMENTS

| 2007/0078797 | A1 | 4/2007 | Won et al. | |
|---|---|---|---|---|
| 2009/0012802 | A1* | 1/2009 | Pinney | G06Q 10/08 |
| | | | | 705/330 |
| 2016/0314429 | A1* | 10/2016 | Gillen | G06Q 10/0833 |
| 2019/0180402 | A1 | 6/2019 | Nakajima et al. | |
| 2021/0090092 | A1* | 3/2021 | Kammes | G06Q 30/0185 |

FOREIGN PATENT DOCUMENTS

| JP | 2008-252615 A | 10/2008 |
|---|---|---|
| JP | 2019-038686 A | 3/2019 |
| JP | 2019-106058 A | 6/2019 |
| JP | 2019-149692 A | 9/2019 |

* cited by examiner

DELIVERY SERVER, SETTLEMENT SYSTEM, COMPUTER READABLE RECORDING MEDIUM, AND TRANSMISSION METHOD

The present application claims priority to and incorporates by reference the entire contents of Japanese Patent Application No. 2020-076223 filed in Japan on Apr. 22, 2020.

BACKGROUND

The present disclosure relates to a delivery server, a settlement system, a computer readable recording medium, and a transmission method.

In the related art, there has been known a doorbell for observing a product that is a home delivery object placed near a front door by changing an image capturing range of a camera based on delivery object information regarding delivery objects delivered to the front door.

SUMMARY

In the known technique, a product that is a home delivery object is merely observed. Incidentally, in recent years, users have desired a technique that enables the users to respond to delivery without opening a door and receive products even when the users are in their residences.

There is a need for a delivery server, a settlement system, a computer readable recording medium, and a transmission method that enable a user to respond to delivery without opening a door and receive a product.

According to one aspect of the present disclosure, there is provided a delivery server including a processor including hardware, the processor being configured to: transmit arrival information of a product to a user terminal carried by a user who has ordered the product; transmit, in a case where unattended delivery is instructed by the user terminal, unattended delivery information to a home delivery terminal of a delivery person who delivers the product, and request a signature of the user; transmit the signature information to the home delivery terminal in response to receiving signature information regarding the signature of the user from the user terminal; and transmit delivery completion information of the product to the user terminal.

DETAILED DESCRIPTION

Hereinafter, a delivery server, a settlement system, and a computer readable recording medium storing a program according to embodiments of the present disclosure will be described with reference to the drawings. Note that the present disclosure is not limited by the embodiments described below.

Figure 1:
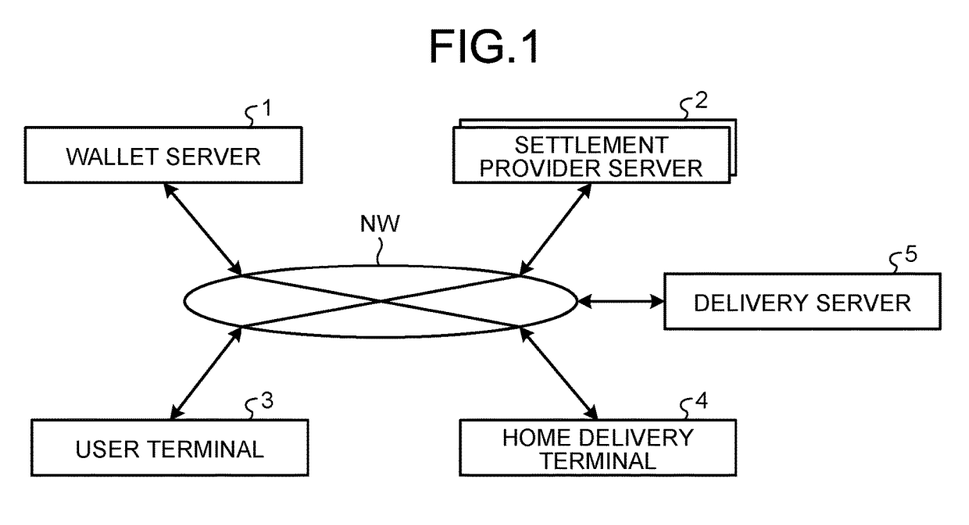
FIG. 1 is a diagram schematically illustrating a configuration of a settlement system according to a first embodiment.
Figure 2:
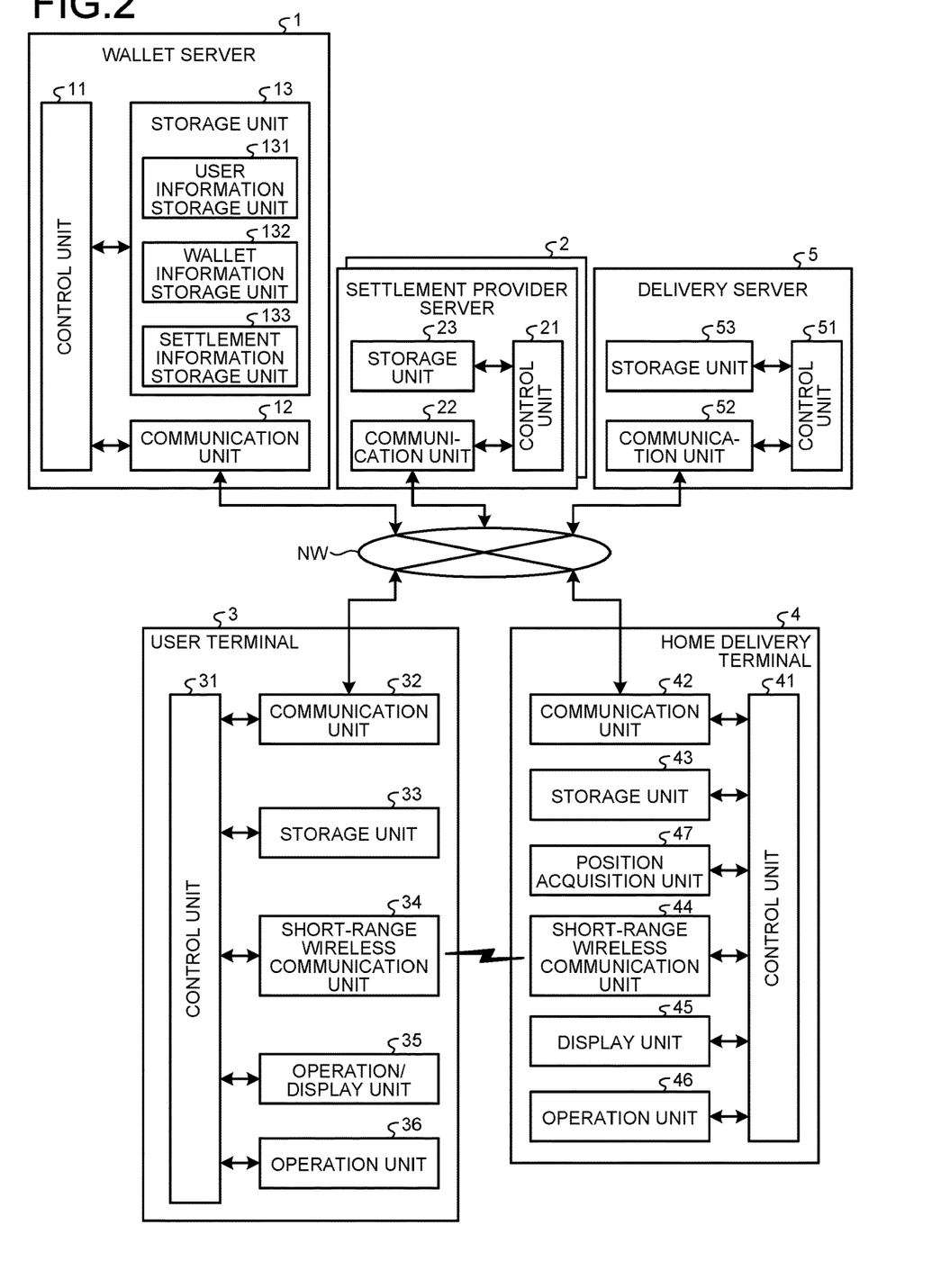
FIG. 2 is a block diagram illustrating a functional configuration of the settlement system according to the first embodiment.

FIG. 1 is a diagram schematically illustrating a configuration of a settlement system according to a first embodiment. FIG. 2 is a block diagram illustrating a functional configuration of the settlement system according to the first embodiment. A settlement system 100 illustrated in FIGS. 1 and 2 includes a wallet server 1, a settlement provider server 2, a user terminal 3, a home delivery terminal 4, and a delivery server 5.

First, the wallet server 1 will be described. The wallet server 1 is a server for comprehensively managing a wallet system. The wallet server 1 includes a control unit 11, a communication unit 12, and a storage unit 13.

The control unit 11 controls each unit that constitutes the wallet server 1. The control unit 11 includes a processor having hardware, such as a central processing unit (CPU) and a field-programmable gate array (FPGA), and a memory (main storage unit) including a random access memory (RAM) and a read only memory (ROM). The control unit 11 loads a program stored in the storage unit 13 into a work area of the main storage unit, executes the program, and controls each unit through the execution of the program.

The communication unit 12 is connected to a network NW such as the Internet serving as a public communication network, and communicates with each of the settlement provider server 2, the user terminal 3, the home delivery terminal 4, and the delivery server 5 via the network NW. The communication unit 12 is implemented by using, for example, a local area network (LAN) interface board or a wireless communication circuit for wireless communication.

The storage unit 13 stores various programs executed by the wallet server 1. The storage unit 13 is implemented by using a hard disk drive (HDD), a solid state drive (SSD), and the like. In addition, the storage unit 13 includes a user information storage unit 131 for each user in the wallet system, a wallet information storage unit 132, and a settlement information storage unit 133.

The user information storage unit 131 stores user information regarding a user who uses the wallet system. Examples of the user information include a user ID of the user who has registered to use the wallet system, a password, a name of the user, contact information (for example, address, phone number, and email address) of the user, terminal information (IP address) of the user, a use registration history, information regarding a payment method registered as a depositing method, information regarding a payment method registered as a settlement method, and a personal identification number at the time of settlement. Note that, in the user information storage unit 131, the user ID and the password are used for authentication processing such as login to the wallet server 1.

The wallet information storage unit 132 stores wallet information regarding a wallet of the wallet system. The wallet is a virtual deposit/withdrawal account of electronic money. Specifically, examples of the wallet information include a user ID, a balance of electronic money, a deposit history of electronic money, and a use history of electronic money.

The settlement information storage unit 133 stores settlement information regarding settlement of the wallet system. The settlement information includes a user ID, a settlement method used for settlement (for example, electronic money payment (contactless payment), scan payment, and code payment), and a settlement history.

Next, a configuration of the settlement provider server 2 will be described. The settlement provider server 2 manages an account and a credit card of the user. The settlement provider server 2 is provided in a financial institution (for example, a bank, a credit union, a credit association, and a labor bank) and a credit card company. The settlement provider server 2 includes a control unit 21, a communication unit 22, and a storage unit 23. Since the control unit 21, the communication unit 22, and the storage unit 23 have functions similar to those of the control unit 11, the communication unit 12, and the storage unit 13, detailed description thereof will be omitted.

The storage unit 23 stores account information and credit card information, for each user of the wallet system. Examples of the account information include a name of the user, an account number, an account balance, and a deposit/withdrawal history. In addition, examples of the credit card information include a name of the user, a credit card number, an expiration date of the credit card, use limit amount, and a card use history.

Next, a configuration of the user terminal 3 will be described. Examples of the user terminal 3 include a smartphone, a mobile phone, a tablet terminal, and a wearable computer, which are carried by the user. The user terminal 3 may be any terminal as long as information may be exchanged with the wallet server 1, the home delivery terminal 4, and the delivery server 5.

The user terminal 3 includes a control unit 31, a communication unit 32, a storage unit 33, a short-range wireless communication unit 34, a display unit 35 (first display), and an operation unit 36. Note that, since the communication unit 32 and the storage unit 33 have functions similar to those of the communication unit 12 and the storage unit 13, detailed description thereof will be omitted.

The control unit 31 controls each unit that constitutes the user terminal 3. The control unit 31 includes a processor having hardware, such as a CPU and a digital signal processor (DSP), and a memory (main storage unit) including a RAM and a ROM. The control unit 31 loads a program stored in the storage unit 33 into a work area of the main storage unit, executes the program, and controls each unit through the execution of the program.

The short-range wireless communication unit 34 is implemented by using a communication module having a communication function conforming to a standard such as near field radio communication (NFC), Bluetooth (registered trademark) low energy (BLE), Wi-Fi (registered trademark), or Infrared Data Association (IrDA), for example. For example, when the user terminal 3 performs electronic money payment, the short-range wireless communication unit 34 performs short-range wireless communication with a store terminal or the home delivery terminal 4.

The display unit 35 is implemented by using a liquid crystal display, an organic electroluminescent display (organic EL display), or the like, and displays various types of information and images under the control of the control unit 31.

The operation unit 36 is implemented by using a touch panel, a button, a switch, and the like, receives operation by the user, and outputs contents corresponding to the received operation to the control unit 31.

Next, a configuration of the home delivery terminal 4 will be described. Examples of the home delivery terminal 4 include a smartphone, a mobile phone, a tablet terminal, and a wearable computer, which are carried by a home delivery person. The home delivery terminal 4 includes a control unit 41, a communication unit 42, a storage unit 43, a short-range wireless communication unit 44, a display unit 45, an operation unit 46, and a position acquisition unit 47. In addition, the home delivery terminal 4 may be any terminal as long as information may be exchanged with the wallet server 1, the user terminal 3, and the delivery server 5. Note that, since the communication unit 42, the storage unit 43, the short-range wireless communication unit 44, the display unit 45 (second display), and the operation unit 46 have functions similar to those of the communication unit 32, the storage unit 33, the short-range wireless communication unit 34, the display unit 35, and the operation unit 36, detailed description thereof will be omitted.

The control unit 41 controls each unit that constitutes the home delivery terminal 4. The control unit 41 includes a processor having hardware, such as a CPU and a DSP, and a memory (main storage unit) including a RAM and a ROM. The control unit 31 loads a program stored in the storage unit 33 into a work area of the main storage unit, executes the program, and controls each unit through the execution of the program.

The position acquisition unit 47 acquires position information regarding a current position of the home delivery terminal 4 and outputs the acquired position information to the control unit 41. The position acquisition unit 47 is implemented by using a GPS sensor, receives signals from a plurality of GPS satellites and transmission antennas, and acquires the position information of the home delivery terminal 4 based on the received signals.

Next, a configuration of the delivery server 5 will be described. The delivery server 5 is a server for managing delivery of a delivery object based on an order from a user. The delivery server 5 includes a control unit 51, a communication unit 52, and a storage unit 53. Since the communication unit 52 and the storage unit 53 have functions similar to those of the communication unit 12 and the storage unit 13, detailed description thereof will be omitted.

The control unit 51 includes a processor having hardware, such as a CPU and a FPGA, and a memory (main storage unit) including a RAM and a ROM. The control unit 51 loads a program stored in the storage unit 53 into a work area of the main storage unit, executes the program, and controls each unit through the execution of the program.

Figure 3:
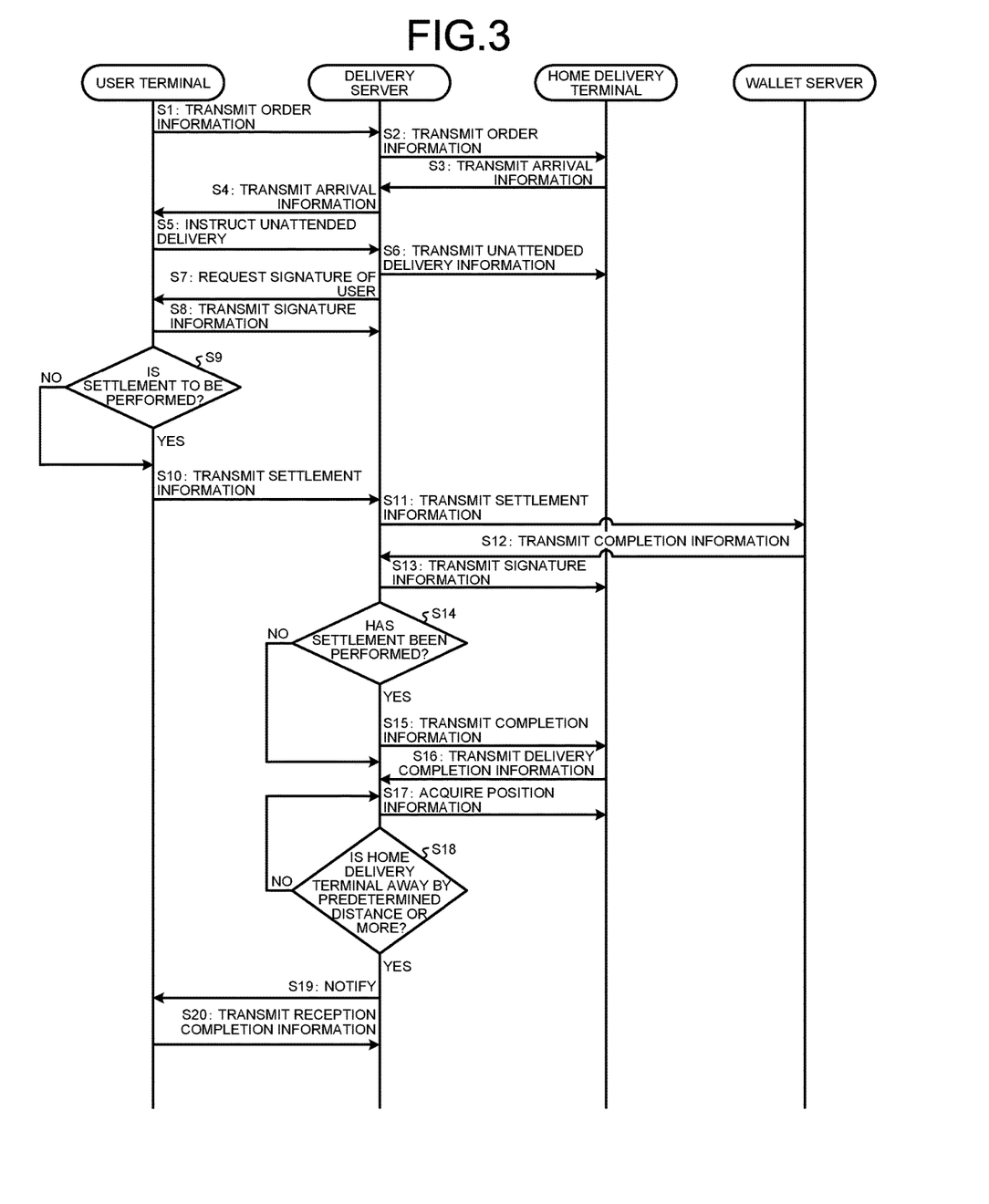
FIG. 3 is a flowchart illustrating an outline of processing executed by the settlement system according to the first embodiment.

Next, processing executed by the settlement system 100 will be described. FIG. 3 is a flowchart illustrating an outline of the processing executed by the settlement system 100.

As illustrated in FIG. 3, first, the control unit 31 of the user terminal 3 transmits, to the delivery server 5, order information of a predetermined product ordered by a user operating the operation unit 36 while viewing an image displayed by the display unit 35 (Step S1). Here, the order information includes the product ordered by the user, an address of the user, and presence or absence of advance settlement.

Subsequently, the delivery server 5 transmits, to the home delivery terminal 4, product information corresponding to the order information transmitted from the user terminal 3 (Step S2). Here, the order information includes the product ordered by the user, the address of the user, and presence or absence of advance settlement. Note that the delivery server 5 may transmit the product information not only to the home delivery terminal 4 but also to a store or a server that manages the product.

Thereafter, the control unit 41 of the home delivery terminal 4 transmits, to the delivery server 5, arrival information indicating arrival at a residence of the user (Step S3). Specifically, the control unit 41 of the home delivery terminal 4 transmits the arrival information to the delivery server 5 when a delivery person inputs information indicating arrival at the residence of the user through the operation unit 46 of the home delivery terminal 4.

Subsequently, the control unit 51 of the delivery server 5 transmits, to the user terminal 3, the arrival information indicating arrival of the product (home delivery object) (Step S4). In this case, the delivery server 5 may acquire position information of the home delivery terminal 4, determine, based on the address of the user included in the order information and the position information of the home delivery terminal 4, whether or not the home delivery person who carries the home delivery terminal 4 has arrived within a predetermined distance (for example, 100 mm) from the residence of the user, and when the home delivery terminal 4 has arrived within the predetermined distance, transmit the arrival information to the user terminal 3.

Thereafter, the user operates the operation unit 36 of the user terminal 3 to instruct unattended delivery of the product (Step S5). In this case, the control unit 31 of the user terminal 3 transmits, to the delivery server 5, instruction information for instructing unattended delivery of the product instructed by the operation of the operation unit 36. Here, the unattended delivery means to deliver a product (home delivery object) to a predetermined place, for example, near a front door, inside a gas meter, a parking lot, or a site of a user.

Subsequently, the control unit 51 of the delivery server 5 transmits, to the home delivery terminal 4, unattended delivery information instructing unattended delivery of the product (Step S6). Here, the unattended delivery information includes a delivery place of the product (home delivery object) designated by the user. In this case, the display unit 45 of the home delivery terminal 4 displays an image and information based on the unattended delivery information under the control of the control unit 41. Thus, the home delivery person may intuitively grasp the place where to arrange the product and how to handle the product.

Thereafter, the control unit 51 of the delivery server 5 requests, to the user terminal 3, a signature of the user for receipt of the product (Step S7). In this case, the display unit 35 of the user terminal 3 displays, under the control of the control unit 31, information for prompting input of the signature (sign) and an icon button for approval.

Subsequently, the user terminal 3 transmits, to the delivery server 5, signature information signed by the user (Step S8).

Thereafter, the control unit 31 of the user terminal 3 determines whether or not settlement is to be performed by using a settlement method selected from a plurality of settlement methods which has been registered in advance by the user in the wallet and by which advance settlement of the product has not been performed (Step S9).

Specifically, the control unit 31 of the user terminal 3 determines whether or not settlement is to be performed by using a settlement method selected from the plurality of settlement methods registered in advance by the user in the wallet, based on presence or absence of advance settlement included in the arrival information transmitted from the delivery server 5. For example, in a case where the arrival information transmitted from the delivery server 5 includes information indicating that settlement is performed when the product is received, the control unit 31 of the user terminal 3 determines that settlement is to be performed by using a settlement method selected from the plurality of settlement methods registered in advance by the user in the wallet. When the control unit 31 of the user terminal 3 determines that settlement is to be performed by using a settlement method selected from the plurality of settlement methods registered in advance by the user in the wallet (Step S9: Yes), the control unit 31 transmits, to the delivery server 5, settlement information regarding the settlement method selected from the plurality of settlement methods registered by the user in the wallet (Step S10). When the control unit 31 of the user terminal 3 determines that settlement is not to be performed by using a settlement method selected from the plurality of settlement methods registered in advance by the user in the wallet (Step S9: No), the user terminal 3 proceeds to Step S20 to be described later.

Subsequently, the delivery server 5 transmits, to the wallet server 1, the settlement information transmitted from the user terminal 3 (Step S11).

Thereafter, the wallet server 1 transmits, to the delivery server 5, completion information indicating completion of settlement (Step S12).

Subsequently, the control unit 51 of the delivery server 5 determines whether or not settlement has been performed by using the settlement method selected from the plurality of settlement methods registered in advance by the user in the wallet (Step S14), and when settlement has been performed by using the settlement method selected from the plurality of settlement methods registered in advance by the user in the wallet (Step S14: Yes), transmits the completion information to the home delivery terminal 4 (Step S15), and when settlement has not been performed by using the settlement method selected from the plurality of settlement methods registered in advance by the user in the wallet (Step S14: No), the delivery server 5 proceeds to Step S17 to be described later.

Thereafter, the control unit 41 of the home delivery terminal 4 transmits, to the delivery server 5, delivery completion information indicating completion of home delivery of the product (Step S16). Here, the home delivery completion information includes a place where the product has been delivered (for example, a photograph), a home delivery person ID identifying the home delivery person, and a time when the product has been delivered.

Subsequently, the control unit 51 of the delivery server 5 acquires position information acquired by the position acquisition unit 47 of the home delivery terminal (Step S17), and determines whether or not the home delivery terminal 4 is away by a predetermined distance or more (Step S18). When the home delivery terminal 4 is away by the predetermined distance or more (Step S18: Yes), the control unit 51 notifies the user terminal 3 of information indicating that the home delivery person is away from the residence of the user by the predetermined distance or more (Step S19), and when the home delivery terminal 4 is not away by the predetermined distance or more (Step S18: No), the delivery server 5 returns to Step S17, and the control unit 51 acquires position information acquired by the position acquisition unit 47 of the home delivery terminal 4 at predetermined time intervals.

Thereafter, the user terminal 3 transmits, to the delivery server 5, reception completion information indicating receipt of the home delivery object delivered by unattended delivery (Step S20).

According to the first embodiment described above, when the control unit 51 of the delivery server 5 is instructed by a user to deliver a product by unattended delivery, the control unit 51 requests a signature of the user to the user terminal 3, and when signature information regarding the signature of the user is input from the user terminal 3, transmits the signature information to the home delivery terminal 4 and transmits delivery completion information to the user terminal 3. Therefore, since it is possible to respond to delivery without opening a door and receive a product, privacy may be secured while securing safety.

In addition, according to the first embodiment, when the control unit 51 of the delivery server 5 performs settlement by using any one of a plurality of different payment methods operated by a plurality of companies and registered by a user in the wallet server indicating a deposit/withdrawal account of electronic money by using the user terminal 3, the control unit 51 transmits, to the home delivery terminal 4, settlement information indicating that settlement has been performed by using any one of the plurality of different payment methods operated by the plurality of companies and registered in the wallet server 1. Therefore, settlement may be performed without opening a door.

In addition, according to the first embodiment, the control unit 51 of the delivery server 5 transmits, to the wallet server 1, a settlement request for settlement by using any one of the plurality of different payment methods operated by the plurality of companies by electronic money deposited in the wallet server 1. Therefore, settlement may be performed by a payment method desired by a user.

In addition, according to the first embodiment, the control unit 51 of the delivery server 5 acquires position information indicating a position of the home delivery terminal 4, determines whether or not a delivery person is away from a delivery destination of the product by a predetermined distance or more based on delivery object information regarding the product and the position information, and when the delivery person is away by the predetermined distance or more, the control unit 51 notifies the user terminal 3 that the delivery person is away by the predetermined distance or more. Therefore, safety of the user may be further secured.

In addition, according to the first embodiment, when reception completion information indicating receipt of a product is input from the user terminal 3, the control unit 51 of the delivery server 5 transmits the reception completion information to the home delivery terminal 4. Therefore, the home delivery person may confirm that the user has received the product.

Note that, in the first embodiment, when the delivery person is away by the predetermined distance or more, the control unit 51 of the delivery server 5 notifies the user terminal 3 that the delivery person is away by the predetermined distance or more, but the present disclosure is not limited to this. For example, the control unit 51 of the delivery server 5 may determine whether or not a predetermined time (for example, 3 minutes) has elapsed after receiving delivery completion information from the home delivery terminal 4, and when the predetermined time has elapsed after receiving the delivery completion information, the control unit 51 may notify the user terminal 3 that the predetermined time has elapsed after the delivery person left. Thus, safety of the user may be further secured.

Next, a second embodiment will be described. A settlement system according to the second embodiment has similar configuration to that of the settlement system 100 according to the first embodiment, and only processing to be executed is different. Specifically, the settlement system according to the second embodiment may instruct unattended delivery by a user terminal according to credibility of a delivery person. In the following, the same components as those of the settlement system 100 according to the first embodiment are denoted by the same reference numerals, and a detailed description thereof will be omitted.

Figure 4:
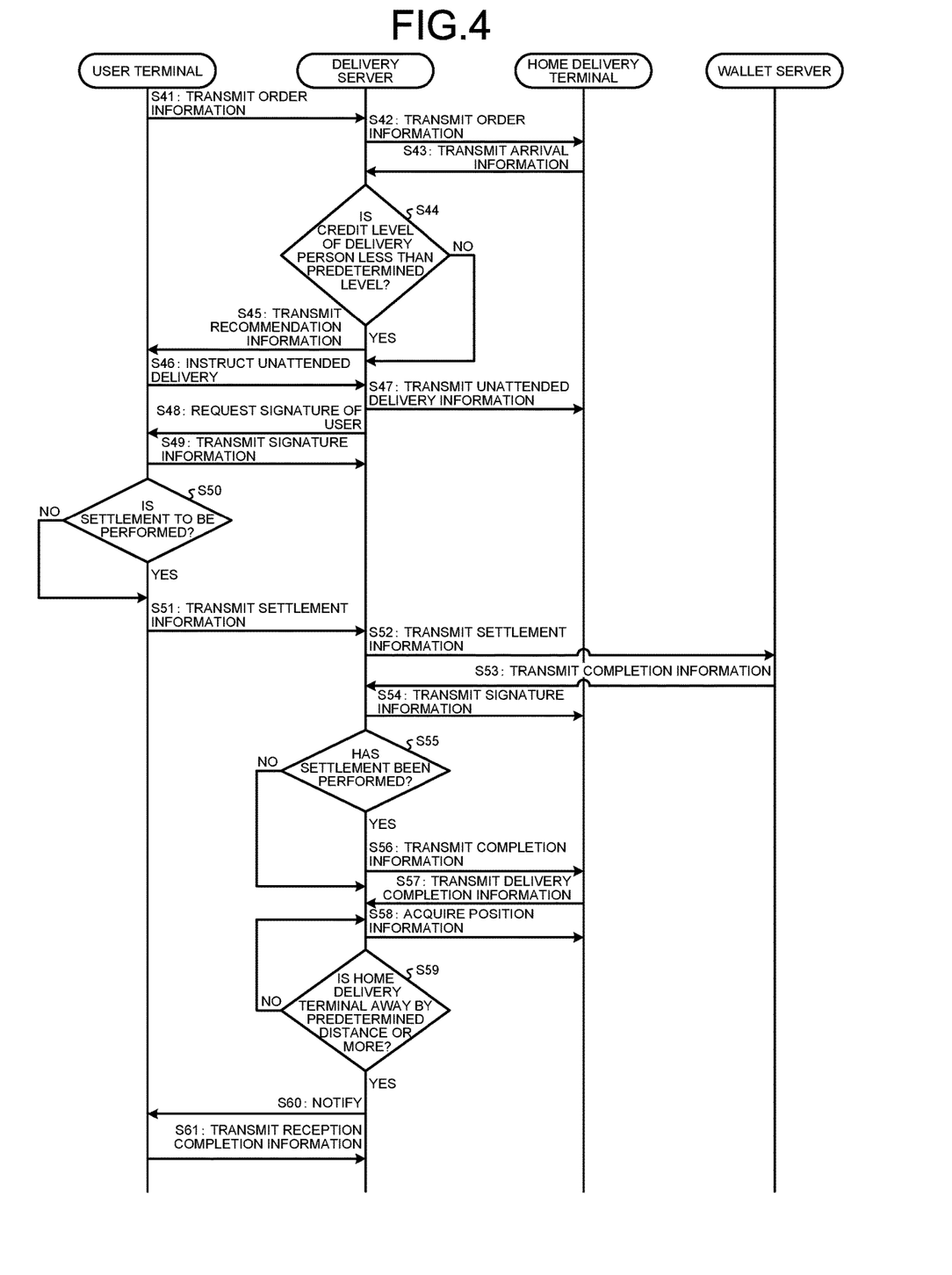
FIG. 4 is a flowchart illustrating an outline of processing executed by a settlement system according to a second embodiment.

FIG. 4 is a flowchart illustrating an outline of processing executed by the settlement system 100 according to the second embodiment. In FIG. 4, Steps S41 to S43 correspond to Steps S1 to S3 in FIG. 3, respectively.

In Step S44, the control unit 51 of the delivery server 5 determines whether or not a credit level of the delivery person is less than a predetermined level by acquiring a device address of the home delivery terminal 4. Specifically, the control unit 51 of the delivery server 5 determines whether or not the credit level associated with the home delivery terminal 4 is less than a predetermined level. Here, the credit level is a level associated with each of a home delivery specialist, a delivery provider, and a delivery partner. For example, a level "3" is associated with the home delivery specialist, a level "2" is associated with the delivery provider, and a level "1" is associated with the delivery partner. When determining that the credit level of the delivery person is less than the predetermined level (for example, less than 3) (Step S44: Yes), the control unit 51 of the delivery server 5 transmits, to the user terminal 3, recommendation information recommending unattended delivery of the product (home delivery object) (Step S45). Thus, the user may take different measures for each home delivery person. In contrast, when the control unit 51 of the delivery server 5 determines that the credit level of the delivery person is not less than the predetermined level (for example, less than 3) (Step S44: No), the delivery server 5 proceeds to Step S47 to be described later.

Steps S46 to S61 correspond to Steps S5 to S20 in FIG. 3, respectively.

According to the second embodiment described above, the control unit 51 of the delivery server 5 determines whether or not a credit level of a delivery person associated with the home delivery terminal 4 is less than a predetermined level, and when the credit level is less than the predetermined level, the control unit 51 transmits, to the user terminal 3, recommendation information recommending unattended delivery of the product. Therefore, safety of a user may be secured.

In addition, in the settlement system according to the first and second embodiments, "unit" may be read as "circuit" or the like. For example, the control unit may be read as a control circuit.

In addition, a program executed by the settlement system according to the first and second embodiments is provided as file data in an installable format or an executable format recorded on a computer-readable recording medium such as a CD-ROM, a flexible disk (FD), a CD-R, a digital versatile disk (DVD), a USB medium, or a flash memory.

In addition, the program executed by the settlement system according to the first and second embodiments may be stored in a computer connected to a network such as the Internet and downloaded via the network to be provided.

Note that, in the description of the flowcharts in the present specification, expressions such as "first", "thereafter", and "subsequently" are used to clarify a relationship between processing of preceding and following steps, but the order of processing to implement the present embodiment is not uniquely determined by such expressions. That is, the order of processing in the flowcharts described in the present specification may be changed to the extent that no inconsistency occurs.

According to the present disclosure, there is an effect that it is possible to respond to delivery of a delivery object without opening a door.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A delivery server comprising:
a processor comprising hardware, the processor being configured to:
transmit arrival information of a product to a user terminal carried by a user who has ordered the product;
transmit, when unattended delivery is instructed by the user terminal, unattended delivery information to a home delivery terminal of a delivery person who delivers the product, and request a signature of the user, the unattended delivery information including an image for display on a display of the home delivery terminal;
transmit signature information to the home delivery terminal in response to receiving the signature information regarding the signature of the user from the user terminal;
receive delivery completion information of the product from the home delivery terminal;
acquire, from a sensor, position information indicating a current position of the home delivery terminal after receiving the delivery completion information;
determine, based on delivery object information regarding the product and the position information, whether or not the delivery person is away from a delivery destination of the product by a predetermined distance or more;
notify the user terminal that the delivery person is away by the predetermined distance or more when the delivery person is away by the predetermined distance or more;
determine whether or not a predetermined time has elapsed after receiving the delivery completion information from the home delivery terminal; and
notify the user terminal that the predetermined time has elapsed after the delivery person left when the predetermined time has elapsed after receiving the delivery completion information.

2. The delivery server according to claim 1, wherein when settlement is performed by using any one of a plurality of different payment methods operated by a plurality of companies and registered by the user in a wallet server indicating a deposit/withdrawal account of electronic money by using the user terminal, the processor is configured to transmit, to the home delivery terminal, settlement information indicating that settlement has been performed by using any one of the plurality of different payment methods operated by the plurality of companies and registered in the wallet server.

3. The delivery server according to claim 2, wherein the processor is configured to transmit, to the wallet server, a settlement request for settlement by using any one of the plurality of different payment methods operated by the plurality of companies by electronic money deposited in the wallet server.

4. The delivery server according to claim 1, wherein the processor is configured to transmit reception completion information to the home delivery terminal when receiving the reception completion information of the product from the user terminal.

5. The delivery server according to claim 1, wherein the processor is configured to
determine whether or not a credit level of the delivery person associated with the home delivery terminal is less than a predetermined level; and
transmit recommendation information recommending the unattended delivery to the user terminal when the credit level is less than the predetermined level.

6. A settlement system comprising:
a delivery server comprising a processor comprising hardware;
a user terminal comprising a first display, the user terminal being configured to communicate with the delivery server and order a product; and
a home delivery terminal comprising a second display and a position acquisition unit configured to acquire, from a sensor, position information regarding a current position of the home delivery terminal, the home delivery terminal being configured to communicate with the delivery server, and suitable for being carried by a delivery person who delivers the product,
wherein the processor is configured to
transmit arrival information of the product to the user terminal and display the arrival information on the first display,
when unattended delivery is instructed by the user terminal, transmit unattended delivery information to the home delivery terminal, cause display of the unattended delivery information on the second display, and request a signature of a user to the user terminal, the unattended delivery information including an image for display on the second display of the home delivery terminal,
transmit signature information to the home delivery terminal and cause display of the signature information on the second display in response to receiving the signature information regarding the signature of the user from the user terminal,
receive delivery completion information of the product from the home delivery terminal,
acquire the position information after receiving the delivery completion information,
determine, based on delivery object information regarding the product and the position information, whether or not the delivery person is away from a delivery destination of the product by a predetermined distance or more,
notify the user terminal that the delivery person is away by the predetermined distance or more, and cause display of the notification on the first display when the delivery person is away by the predetermined distance or more,
determine whether or not a predetermined time has elapsed after receiving the delivery completion information from the home delivery terminal, and
notify the user terminal that the predetermined time has elapsed after the delivery person left, and cause display of the notification on the first display when the predetermined time has elapsed after receiving the delivery completion information.

7. The settlement system according to claim 6, wherein when settlement is performed by using any one of a plurality of different payment methods operated by a plurality of companies and registered by the user in a wallet server indicating a deposit/withdrawal account of electronic money by using the user terminal, the processor is configured to transmit, to the home delivery terminal, settlement information indicating that settlement has been performed by using any one of the plurality of different payment methods operated by the plurality of companies and registered in the wallet server, and display the settlement information on the second display.

8. The settlement system according to claim 7, wherein the processor is configured to transmit, to the wallet server, a settlement request for settlement by using any one of the plurality of different payment methods operated by the plurality of companies by electronic money deposited in the wallet server.

9. The settlement system according to claim 6, wherein the processor is configured to transmit reception completion information to the home delivery terminal and display the reception completion information on the second display when receiving the reception completion information of the product from the user terminal.

10. The settlement system according to claim 6, wherein the processor is configured to:
    determine whether or not a credit level of the delivery person associated with the home delivery terminal is less than a predetermined level; and
    transmit recommendation information recommending the unattended delivery to the user terminal, and display the recommendation information on the first display when the credit level is less than the predetermined level.

11. A non-transitory computer-readable recording medium on which an executable program is recorded, the program causing a processor of a computer to execute:
    transmitting arrival information of a product to a user terminal carried by a user who has ordered the product;
    transmitting, when unattended delivery is instructed by the user terminal, unattended delivery information to a home delivery terminal of a delivery person who delivers the product, and requesting a signature of the user, the unattended delivery information including an image for display on a display of the home delivery terminal;
    transmitting signature information to the home delivery terminal in response to receiving the signature information regarding the signature of the user from the user terminal;
    receiving delivery completion information of the product from the home delivery terminal;
    acquiring, from a sensor, position information indicating a current position of the home delivery terminal after receiving the delivery completion information;
    determining, based on delivery object information regarding the product and the position information, whether or not the delivery person is away from a delivery destination of the product by a predetermined distance or more;
    notifying the user terminal that the delivery person is away by the predetermined distance or more when the delivery person is away by the predetermined distance or more;
    determining whether or not a predetermined time has elapsed after receiving the delivery completion information from the home delivery terminal; and
    notifying the user terminal that the predetermined time has elapsed after the delivery person left when the predetermined time has elapsed after receiving the delivery completion information.

12. The non-transitory computer-readable recording medium according to claim 11, wherein the program causes the processor to execute:
    when settlement is performed by using any one of a plurality of different payment methods operated by a plurality of companies and registered by the user in a wallet server indicating a deposit/withdrawal account of electronic money by using the user terminal, transmitting, to the home delivery terminal, settlement information indicating that settlement has been performed by using any one of the plurality of different payment methods operated by the plurality of companies and registered in the wallet server.

13. The non-transitory computer-readable recording medium according to claim 12, wherein the program causes the processor to execute transmitting, to the wallet server, a settlement request for settlement by using any one of the plurality of different payment methods operated by the plurality of companies by electronic money deposited in the wallet server.

14. A method of transmission, the method comprising:
    transmitting arrival information of a product to a user terminal carried by a user who has ordered the product;
    transmitting, when unattended delivery is instructed by the user terminal, unattended delivery information to a home delivery terminal of a delivery person who delivers the product, and requesting a signature of the user, the unattended delivery information including an image for display on a display of the home delivery terminal;
    transmitting the signature information to the home delivery terminal in response to receiving signature information regarding the signature of the user from the user terminal;
    receiving delivery completion information of the product from the home delivery terminal;
    acquiring, from a sensor, position information indicating a current position of the home delivery terminal after receiving the delivery completion information;
    determining, based on delivery object information regarding the product and the position information, whether or not the delivery person is away from a delivery destination of the product by a predetermined distance or more;
    notifying the user terminal that the delivery person is away by the predetermined distance or more when the delivery person is away by the predetermined distance or more;
    determining whether or not a predetermined time has elapsed after receiving the delivery completion information from the home delivery terminal; and
    notifying the user terminal that the predetermined time has elapsed after the delivery person left when the predetermined time has elapsed after receiving the delivery completion information.

* * * * *